US012590599B2

(12) United States Patent　　　　　(10) Patent No.:　US 12,590,599 B2
Eliot　　　　　　　　　　　　　　　　　　　(45) Date of Patent:　　Mar. 31, 2026

(54) FIRE HOSE COUPLINGS AND ADAPTERS

(71) Applicant: Scott Taylor Eliot, Lakeville, OH (US)

(72) Inventor: Scott Taylor Eliot, Lakeville, OH (US)

( * ) Notice: Subject to any disclaimer, the term of this patent is extended or adjusted under 35 U.S.C. 154(b) by 326 days.

(21) Appl. No.: 18/111,698

(22) Filed: Feb. 20, 2023

(65) Prior Publication Data

US 2023/0193937 A1　　　Jun. 22, 2023

Related U.S. Application Data

(62) Division of application No. 15/923,322, filed on Mar. 16, 2018, now Pat. No. 11,624,389.

(60) Provisional application No. 62/477,676, filed on Mar. 28, 2017.

(51) Int. Cl.
　　*F16B 9/00*　　　　(2006.01)
　　*A62C 33/00*　　　(2006.01)
　　*A62C 33/04*　　　(2006.01)
　　*F16B 5/00*　　　(2006.01)
　　*F16L 35/00*　　　(2006.01)

(52) U.S. Cl.
　　CPC ............... *F16B 9/05* (2018.08); *A62C 33/00* (2013.01); *A62C 33/04* (2013.01); *F16B 5/0052* (2013.01); *F16L 35/00* (2013.01)

(58) Field of Classification Search
　　CPC ......... A62C 33/00; A62C 33/04; F16L 35/00; F16L 15/08; F16L 2201/60; F16B 9/023; F16B 9/05; F16B 5/0052
　　See application file for complete search history.

(56) References Cited

U.S. PATENT DOCUMENTS

| | | | |
|---|---|---|---|
| 1,168,068 A | 1/1916 | Harrison | |
| 1,225,616 A | 5/1917 | Gough et al. | |
| 1,836,716 A | 12/1931 | Huthsing | |
| 1,936,359 A * | 11/1933 | Huthsing | F16L 19/00 |
| | | | 285/39 |
| 2,360,163 A | 10/1944 | Sadler | |
| 2,830,480 A * | 4/1958 | Brame | B25B 13/48 |
| | | | 81/176.15 |
| 3,160,245 A | 12/1964 | Pavlecka | |
| 3,160,249 A | 12/1964 | Pavlecka | |
| 3,875,721 A | 4/1975 | Mengeringhausen et al. | |
| 4,133,561 A | 1/1979 | Cannon et al. | |
| 4,142,343 A | 3/1979 | Trafton | |
| 4,194,338 A | 3/1980 | Trafton | |
| 4,484,560 A | 11/1984 | Tanigawa | |
| 4,652,170 A | 3/1987 | Lew | |
| 4,858,960 A | 8/1989 | Pharaon | |
| 5,247,715 A * | 9/1993 | Nishiguchi | B25B 13/28 |
| | | | 7/138 |

(Continued)

*Primary Examiner* — Matthew R Mcmahon
(74) *Attorney, Agent, or Firm* — Renner, Kenner, Greive, Bobak, Taylor & Weber Co., LPA

(57)　　　　　　ABSTRACT

Fire hose couplings and adapters are configured to receive, by any of various types of interconnections, a wide range of attachments enhancing the utility of the associated fire hose. The attachments are secured to the coupler or adapter by way of an appropriate locking engagement, such as by a dovetail connector, setscrews, chemical attachment, adhesives and the like. The attachments cover a broad range of handles, reflective and directional devices, analog and digital sensors/monitors/indicators, and carabiners, and both threaded and unthreaded studs adapted for appropriate receipt of any of a broad range of attachments or uses.

4 Claims, 9 Drawing Sheets

(56)  References Cited

U.S. PATENT DOCUMENTS

| | | | | |
|---|---|---|---|---|
| 5,261,460 | A | 11/1993 | Rupp | |
| D374,408 | S | 10/1996 | McMillan | |
| 5,623,890 | A | 4/1997 | Lenske | |
| 5,762,410 | A | 6/1998 | Lutz | |
| 6,733,045 | B2 * | 5/2004 | Harrington | F16L 37/252 |
| | | | | 285/376 |
| 7,387,320 | B2 | 6/2008 | Kozey | |
| 7,640,884 | B2 | 1/2010 | Tamez, Jr. | |
| 8,485,074 | B2 * | 7/2013 | Farrell | A62C 99/00 |
| | | | | 7/138 |
| 8,485,562 | B2 | 7/2013 | Zerrer | |
| 8,567,823 | B2 * | 10/2013 | Stroope | F16L 37/1215 |
| | | | | 285/38 |
| 9,057,353 | B2 | 6/2015 | Aubuchon, Sr. | |
| 9,103,474 | B2 | 8/2015 | Richardson | |
| 9,186,780 | B2 * | 11/2015 | Dumaine | B25B 19/00 |
| 9,415,487 | B2 | 8/2016 | Wilson et al. | |
| 9,630,201 | B2 | 4/2017 | Fabrey | |
| 9,744,826 | B2 * | 8/2017 | Cox | B60G 15/063 |
| 10,668,601 | B2 | 6/2020 | Nelsen et al. | |
| 11,117,245 | B2 * | 9/2021 | Rodeheaver | B25B 13/5091 |
| 2007/0063512 | A1 | 3/2007 | Tamez, Jr. | |
| 2017/0122472 | A1 | 5/2017 | Meza et al. | |
| 2017/0363232 | A1 * | 12/2017 | Varnado | B25B 13/5091 |
| 2020/0070320 | A1 * | 3/2020 | Varnado | B25B 13/5091 |
| 2021/0001161 | A1 * | 1/2021 | Cambria | A62C 33/04 |

* cited by examiner

FIRE HOSE COUPLINGS AND ADAPTERS

CROSS-REFERENCE

This application is a divisional of pending U.S. patent application Ser. No. 15/923,322, filed Mar. 16, 2018, now U.S. Pat. No. 11,624,389, which claimed priority to U.S. Provisional Patent Application Ser. No. 62/477,676, filed Mar. 28, 2017.

TECHNICAL FIELD

The invention herein resides in the art of fire hose couplings and adapters. More particularly, the invention relates to such couplings and adapters that serve functions and purposes beyond those of simply coupling or adapting the interconnection of one hose or member to another. Most particularly, the invention relates to fire hose couplings and adapters of such nature that they are capable of receiving any of a host of auxiliary implements to facilitate the use of the associated fire hose and to provide for the safety of the firefighters using them.

BACKGROUND ART

In the art of firefighting hoses and equipment, it is well known that fire hoses typically come in fixed lengths and, to accommodate extension of the fire nozzle to a useful position while fighting a fire, various hose extensions must be employed. These extensions are typically interconnected with each other by means of couplings, which have heretofore been well known and readily received in the art.

By way of example, FIGS. 1 and 2 respectively show a perspective view and a front elevational view of a prior art coupler that is designated generally by the numeral 10. The coupler 10 is shown as a blank, not having any threads or other means of connecting engagement provided thereon.

For relevant purposes hereto, the prior art coupler blank 10 is shaped in the form of an annular ring 12 having an outer circumferential surface 14 and an inner circumferential surface 16. It will be appreciated by those skilled in the art that the prior art coupler blank 10 is formed to mate with another coupler, each being connected to an end of a respective piece of hose, and being adapted to mate with each other. Typically, the inner circumferential surface 16 will be threaded with internal threads to function as a female piece, while a mating coupler will be characterized by a threaded piece extending from the inner circumferential surface 16. The male and female pieces may then be appropriately interconnected.

It is further contemplated that the coupler of the instant invention may alternatively have cam and groove connections or the "VIC" mating connectors as are now well known in the industry.

Lugs 18, typically three or four in nature, are positioned about the outer circumference 14 of the coupler blank 10 and are adapted to receive a lug wrench for effecting the desired mating connection. In general, the lugs 18 are spaced 120° or 90° apart, depending upon the number employed.

Also common to the prior art coupler blank 10 is a Higbee indicator, which is well known in the art for use in facilitating the alignment of mating pieces.

It will be appreciated that the prior art shown in FIGS. 1 and 2, while serving well to accommodate a rapid and effective coupling or interconnection between respective hose pieces, serves no other function. However, in the firefighting environment, firefighters and emergency works need every benefit available to keep them well informed regarding the environment they are in, escape routes, the functionality of the equipment, ease of manipulation of the fire hose, further ability to fixedly position the hose or nozzle on a ladder or the like, and any of numerous other capabilities.

DISCLOSURE OF INVENTION

In light of the foregoing, it is a first aspect of the invention to provide fire hose couplings and adapters that serve functions well beyond those of simply interconnecting fire hose pieces or providing adaptation for such interconnections.

Another aspect of the invention is to provide fire hose couplings and adapters that incorporate the prior art structures and techniques for coupling fire hose pieces together while accommodating a plurality of new uses.

Still a further aspect of the invention is the provision of fire hose couplings and adapters in which the outer circumference of the coupler is characterized by configurations that accommodate mating connection with auxiliary operational and/or safety devices while further providing for ease of reading and manipulation by an operator.

Still a further aspect of the invention is the provision of fire hose couplings and adapters, wherein the couplings are adapted to receive long-handled attachments.

A further aspect of the invention is the provision of fire hose couplings and adapters wherein the coupling has an external configuration adapted for receipt of standard rocker lug attachments, if desired.

Still another aspect of the invention is the provision of fire hose couplings and adapters accommodating receipt of marking indicia specifying the pressure side of the coupler and a route of escape from the fire.

An additional aspect of the invention is the provision of fire hose couplings and adapters that accommodate the addition of a closed-loop handle for purposes of manipulation of the hose.

Another aspect of the invention is the provision of fire hose couplings and adapters in which the coupler itself is adapted to securely receive any of various sensors, monitors or indicators of an electronically operated and digital or analog type.

Yet a further aspect of the invention is the provision of fire hose couplings and adapters that can receive color-coded inserts that can be used to indicate the truck, port, or other source of the liquid flowing through the associated hose and/or whether any additive(s) has been added to that liquid.

Other aspects of the invention are achieved by fire hose couplings and adapters that provide for the implementation of studs, whether threaded or not, interconnected with the coupler or adapter for receiving handles or other implements or for attachment to aerial ladders and the like, or for receipt of carabiners or other hooks or connectors.

SUMMARY OF THE INVENTION

The foregoing and other aspects of the invention that will become apparent as the detailed description proceeds are achieved by a fire hose coupler comprising an outer circumferential surface configured to accommodate mating connection with auxiliary devices; and an auxiliary device taken from the group of operational and safety devices in mating connection with said circumferential surface.

Additional aspects of the invention are achieved by a fire hose coupler comprising an annular ring having an outer circumferential surface configured to effect mating connections; and a plurality of auxiliary devices configured to be received by said annular ring through said mating connection and wherein said mating connections are releasable.

DETAILED DESCRIPTION OF DRAWINGS

For a complete understanding of the invention reference should be made to the following detailed description and accompanying drawings wherein.

DETAILED DESCRIPTION OF PREFERRED EMBODIMENT

Figures 1, 2, 3, 4:
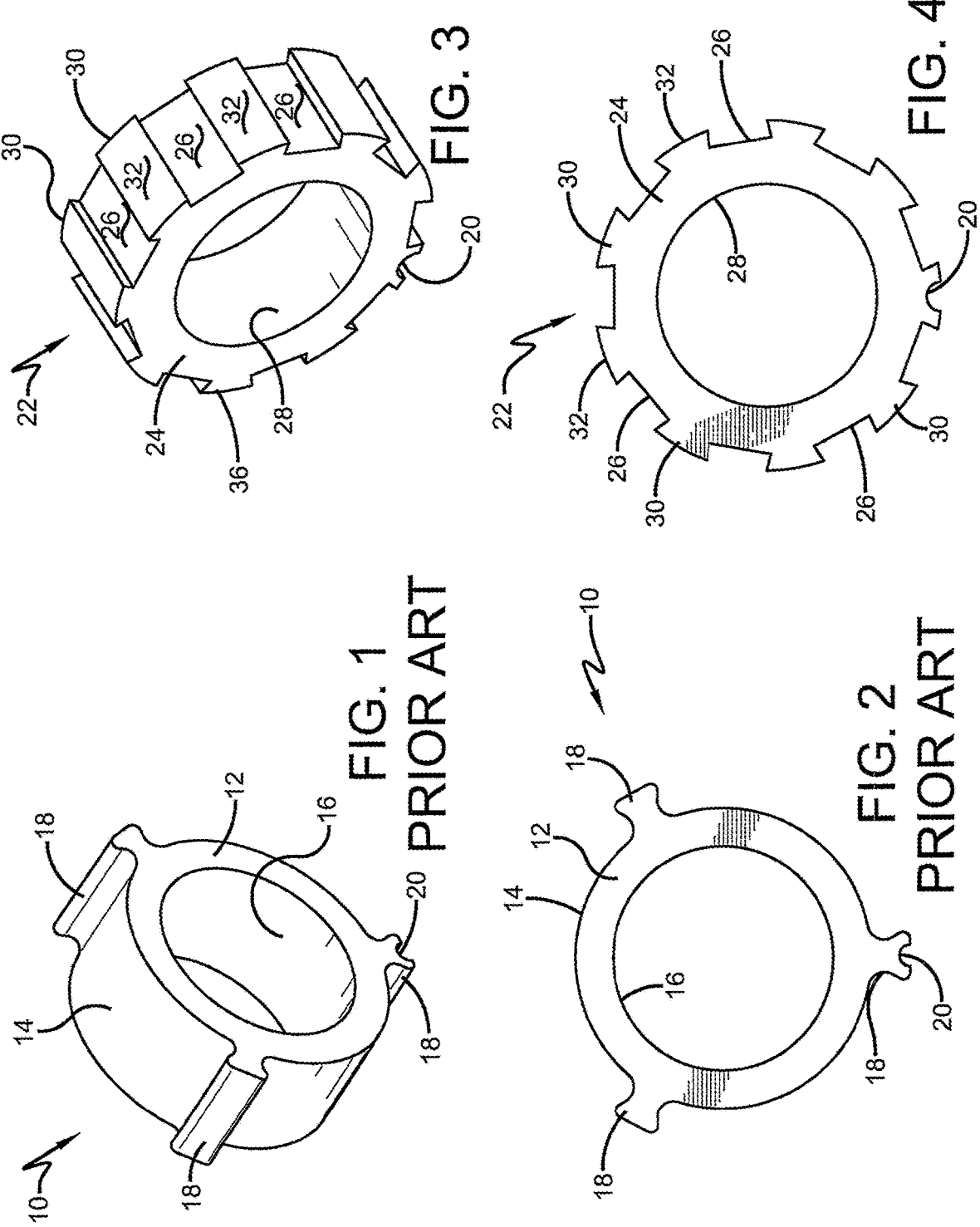
FIG. 1 is a perspective view of a prior art coupler blank to be substituted by those of the instant invention.
FIG. 2 is a front elevational view of the coupler blank of FIG. 1.
FIG. 3 is a perspective view of a coupler blank made in accordance with the invention.
FIG. 4 is a front perspective view of the coupler blank of FIG. 3.

Referring now to the drawings and again to FIGS. 1 and 2, an appreciation can again be obtained as to the structure and characteristics of the prior art coupling blanks as designated generally by the numeral 10. It will, of course, be appreciated throughout, that while reference is made to a coupler blank, finished to be employed as a hose coupler or the like, the concept, structures, and techniques of the invention are equally applicable to adapters and the like as customarily employed in the art of firefighting.

With particular reference to FIG. 3, it can be seen that a coupler blank made in accordance with the invention is designated generally by the numeral 22. It will be appreciated that the coupler 22 consists of an annular ring 24 having an outer flat surface 26 resulting from milling or cutting the blank 22 from an extruded aluminum stock, the overall thickness of the coupler 22 being determined by the spacing of such cuts.

The inner circumference 28 of the annular ring 24 is shown without mating configurations, but those skilled in the art will appreciate that the coupler blank 22 could have the inner circumference 28 threaded as with a female thread adapted for receiving, in mating engagement, the male thread of the element to which it is to be coupled. Any of various types of other mating connections can characterize the coupler blanks described herein, including cam and groove or "VIC" mating structures.

As shown in FIGS. 3 and 4, dovetail-shaped lugs 30, with undercut lateral sides, extend inwardly to the longitudinal flat outer surface 26 and outwardly to the radiused top curved surface 32. The curve of the surfaces 32 falls within the circle defined by the outer perimeter of the coupler blank 22.

With continued reference to FIGS. 3 and 4, it will be seen that the dovetail-shaped lugs 30 are uniformly spaced about the outer circumference of the blank 22 and are adapted to receive the prior art lug wrench adapted for use by the prior art coupler blanks 10. Moreover, the Higbee indicator 20 is also provided.

As will become apparent throughout the remainder of the description, the dovetail-shaped lugs 30, extending between the curved radius outer circumferential surfaces 32 and the inner flat longitudinal surfaces 26, provide for dovetail interconnection of various types of attachments, aids, tools, and the like. It will also be appreciated that the uniformly spaced dovetailed elements about the outer surface of the coupler blank 22 enhances the hand grip that can be applied by the firefighter to the coupler itself.

Figures 5, 6, 7, 8:
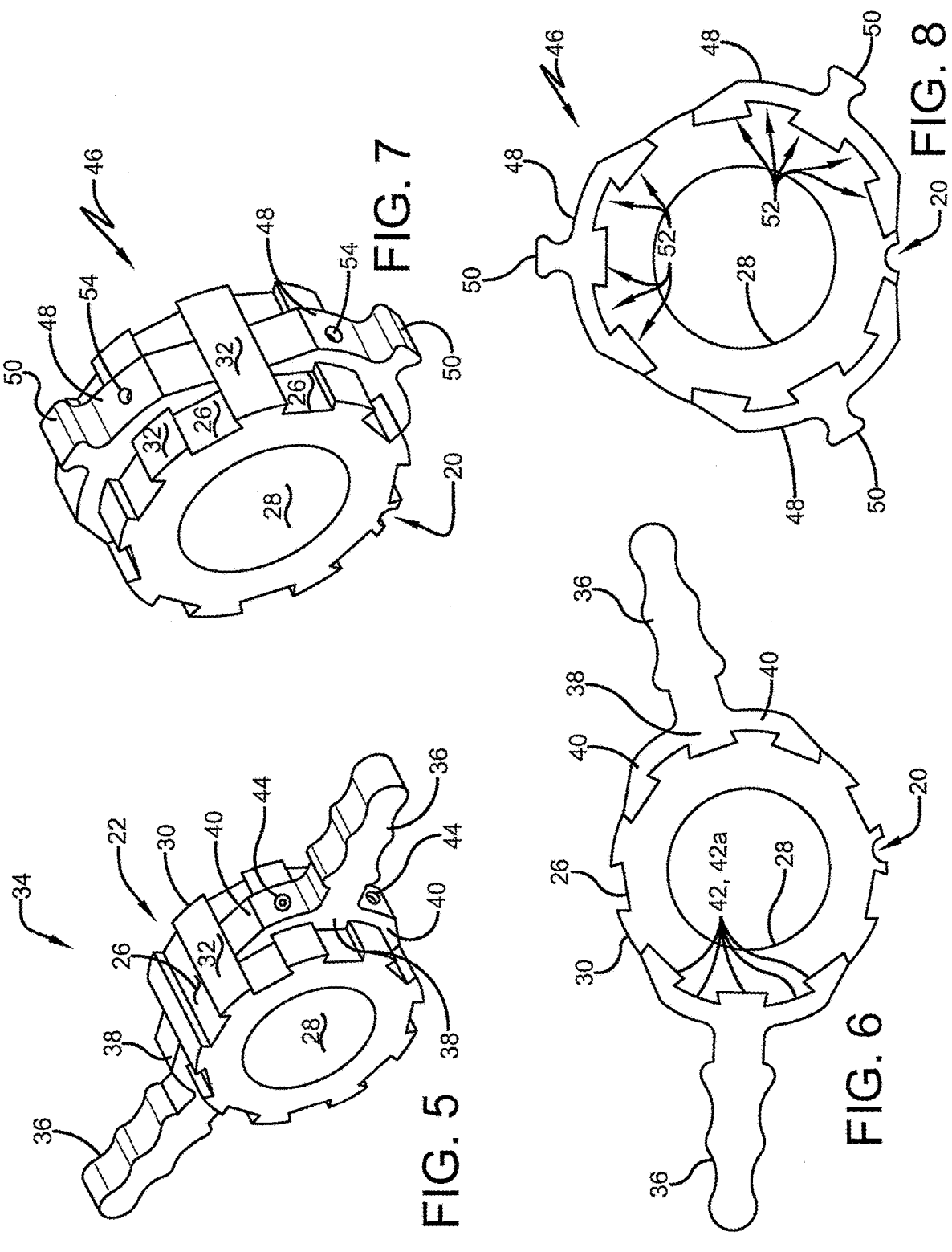
FIG. 5 is a perspective view of the coupler blank of the invention, showing the same receiving a pair of external long handles.
FIG. 6 is a front elevational view of the structure of FIG. 5.
FIG. 7 is a perspective view of a coupler blank made in accordance with the invention and showing the same being convertible to the lug arrangement of the prior art of FIGS. 1 and 2.
FIG. 8 is a front elevational view of the coupler blank of FIG. 7.

With reference now to FIGS. 5 and 6, it can be seen that a coupler blank 34 is shown in receipt of mating dovetailed connectors of long-handled attachments in the form of ribbed handles 36. As shown, each of the ribbed handles 36 has a base 38 with a pair of legs 40 extending on opposite sides thereof, each having a dovetailed lower surface 42 that slidingly mates with the outer longitudinal flat surface 26, top curved surface 32, and intervening dovetail-shaped lugs 30. The dovetailed configurations at the distal end of the ribbed handles 36 make sliding mating connection with the dovetail-shaped lugs 30 when the mating members are slid axially as the ribbed handles 36 are positioned upon the blank 34. When appropriately positioned axially, the ribbed handles 36 are locked in place by appropriate setscrews 44 engaging the top curved surfaces 32 of associated lugs 30.

It will be appreciated by those skilled in the art that, while the ribbed handles 36 may be engaged as just described by sliding the same into the dovetailed interconnection and securing them by means of setscrews, other appropriate means may also be employed. It is contemplated that the dovetail connector 42 at the distal end of the handle 36 may, in fact, have an axial taper 42a to it such that it is swaged or locked onto the dovetail connector of the blank 34 by a friction fit or the like. Suffice it to say that the instant invention contemplates any of various appropriate means of fixedly securing the ribbed handles 36 to the outer dovetailed surface of the blank 34.

With reference now to FIGS. 7 and 8, it can be seen that a coupler blank 46 is adapted for receiving, by appropriate connection such as a dovetail connection, standard rocker lug attachments 48, exhibiting the lugs 50 such as those of the prior art of FIGS. 1 and 2. Again, a dovetail mating interconnection, as at 52, allows for the implementation of the standard rocker lug attachments 48. The mating dovetail connections may be engaged by key and keyway sliding or wedged engagement. If simple key and keyway sliding engagement is employed, a setscrew or setscrews 54 may be employed to lock the attachments 48 in place. The result, as shown in FIGS. 7 and 8, is a replication of the prior art arrangement. Again, and as is standard, the Higbee indicator 20 remains employed in association with the coupler.

Figures 9, 10, 11, 12:
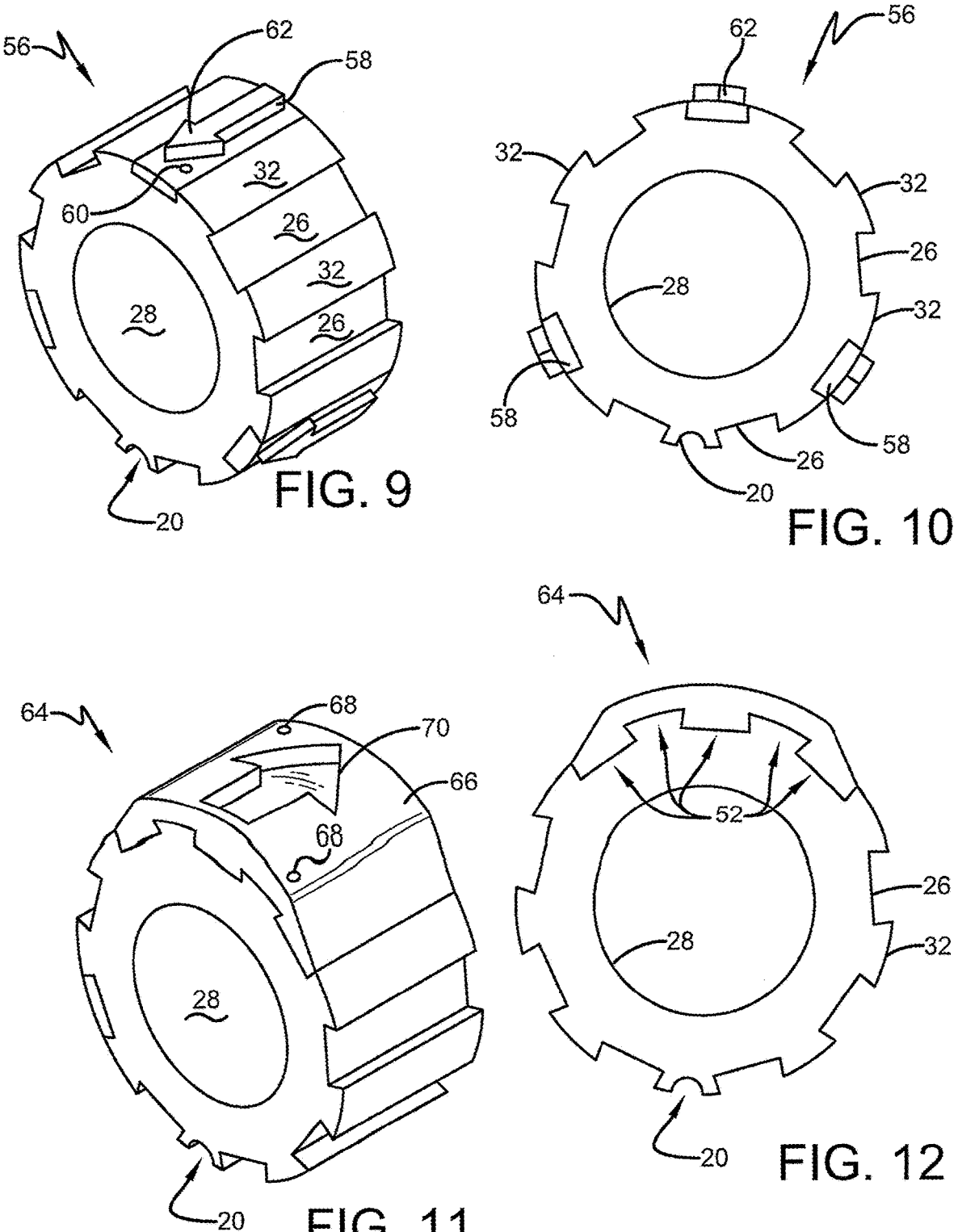
FIG. 9 is a perspective view of the coupler blank of the invention, showing the same receiving external directional elements.
FIG. 10 is a front elevational view of the coupler blank of FIG. 9.
FIG. 11 is a perspective view of a coupler blank of the invention, showing the receipt of a single directional element adapted for mating engagement across three dovetail locking members.
FIG. 12 is a front elevational view of the coupler blank of FIG. 11.

With reference now to FIGS. 9 and 10, it can be seen that a further coupler blank and associated attachment is designated generally by the numeral 56. Here, a direction indication insert 58 is received by one of the ways or longitudinal flat surfaces 26 and wedged beneath the undercuts on the opposite sides thereof, and is held in place by appropriate setscrew 60 or by a swage or friction fit, or by appropriate chemical bonding. As shown, the insert 58 can be of any of various configurations, including that of a directional arrow or the like, extending above the top surface of the insert 58 and oriented such that it points toward a desired location, such as the exterior of the building, or to where the tanker truck or the like is located. In other words, opposite the direction of fluid flow. It is further contemplated that the arrow or other directional indicia may be color coded. Such a raised arrow 62 may aid a firefighter in escaping away (back along the hose line) from the fire in a smoke-filled room/area. The size and shape of the indicia 62 may vary. Again, as with the other embodiments of the invention disclosed herein, the concept is equally applicable to couplers and adapters.

With reference now to FIGS. 11 and 12, it can be seen that yet another attachment for the coupler or adapter blank of the instant invention is designated generally by the numeral 64 showing an insert 66 appropriately connected such as by the dovetail connection discussed hereinabove and as fixed by the utilization of setscrews 68 or the like. Again, in addition to the keyway interconnection discussed in detail above, other means of connection might be employed, such as chemical bonding, friction fit, swaging, and the like.

In the embodiment of FIGS. 11 and 12, a recessed indicator, such as a directional arrow 70, is employed. Here again, the arrow will typically be used to point in a direction readily apparent to a firefighter. Typically, such will be pointed to the end of the hose attached to an appropriate tanker truck or the like, which will be associated with the exit of the building being serviced by the firefighter.

It will be appreciated that in the embodiment 64, recessed indicia 70 may receive a reflective tape in the bottom thereof, or may be poured full with a reflective material for quick recognition by a firefighter or the like.

Figures 13, 14, 15, 16:
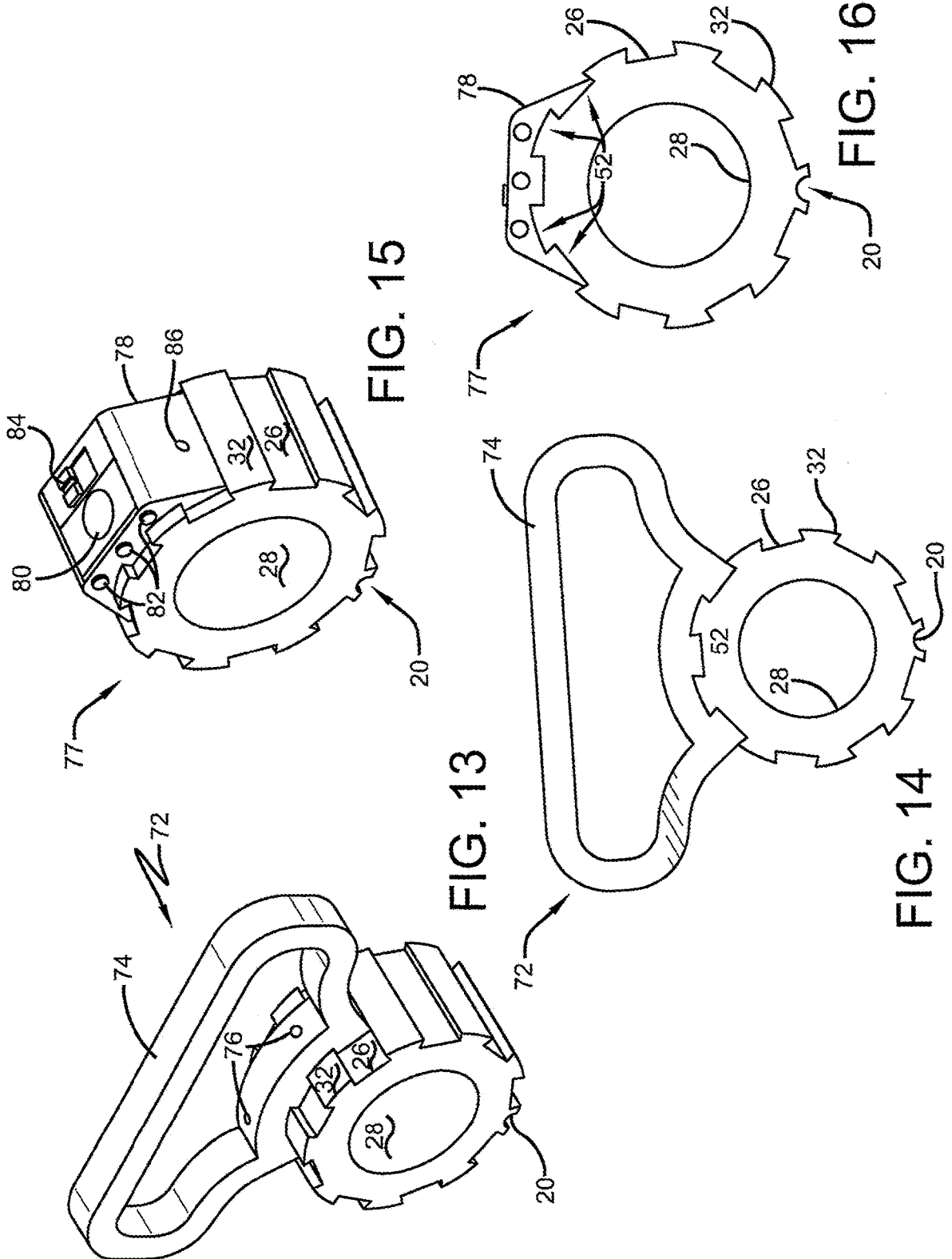
FIG. 13 is a perspective view of a coupler blank made in accordance with the invention and receiving a handle attachment.
FIG. 14 is a front elevational view of the coupler blank of FIG. 13.
FIG. 15 is a perspective view of a coupler blank made in accordance with the invention and receiving in locking engagement a sensor/monitor/indicator.
FIG. 16 is a front elevational view of the coupler blank of FIG. 15.

Referencing now to FIGS. 13 and 14, it will be appreciated that yet another coupler or adapter blank 72 is shown in association with the attachment of a handle 74 received by the keys and ways 26, 32, 52 as described above, and locked to the dovetail interconnection by means of appropriate setscrews 76 impacting the radiused surfaces 32.

The handle 74 can aid a firefighter in advancing the hose line. The size and shape of the handle 74 may vary. While again, a blank is shown in the drawings, the concept applies equally to both couplings and adapters.

With reference to FIGS. 15 and 16, the broad adaptability of the concept of the invention can be appreciated by reference to a coupler or adapter blank 77, shown as receiving, with the techniques repeatedly described above, a sensor/monitor/indicator 78. A sensor 80, such as a sensor for water pressure, oxygen levels, toxic fumes, or the like, has an associated plurality of light-emitting diodes (LEDs) 82 for emitting appropriate warning signals relating to the parameters being measured and monitored. A control switch 84 is provided for activating or deactivating any of the various sensors/monitors/indicators 78. The unit 78 is secured in its dovetail interconnection by means of appropriate setscrews 86. Finally, it will be appreciated that the indicia of the LEDs 82 may be supplemented by tweets, flashes or the like, warning when certain conditions are or are not met. Such audible or visual signals may also aid the firefighter in a smoke-filled room in overcoming disorientation.

Figures 17, 18, 19, 20:
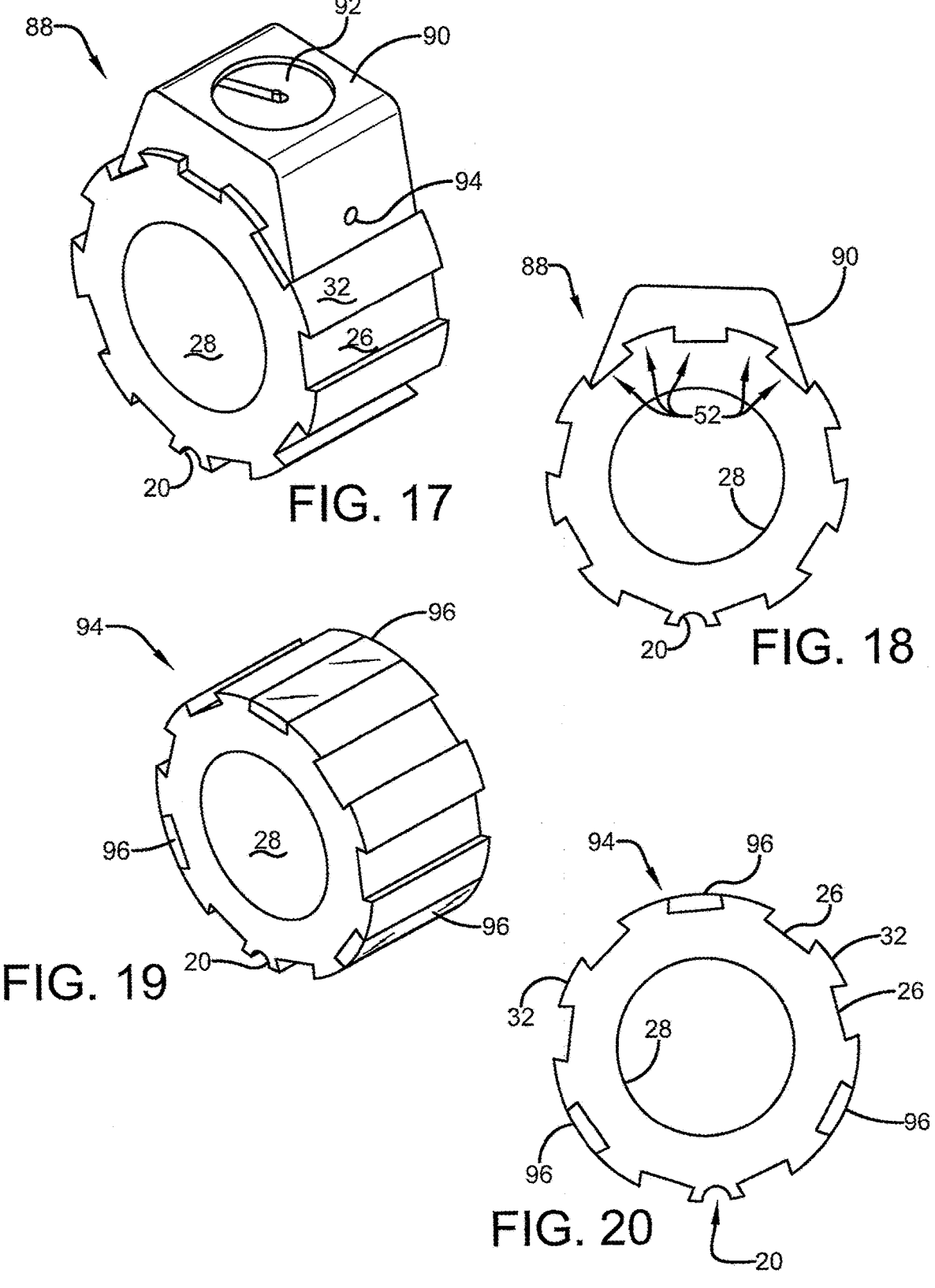
FIG. 17 is a perspective view of a coupler blank according to the invention and receiving an analog dial-type pressure gauge.
FIG. 18 is a front elevational view of the coupler of FIG. 17.
FIG. 19 is a perspective view of a coupler blank according to the invention and showing the same receiving a plurality of uniformly spaced reflective bars.
FIG. 20 is a front elevational view of the coupler blank of FIG. 19.

With reference now to FIGS. 17 and 18, an additional coupler blank is designated generally by the numeral 88 and includes the attachment of a sensor 90, which, in this case, is an analog sensor, such as one for sensing water pressure, temperatures or the like. The sensor 90 includes a readout dial 92, as shown.

With reference now to FIGS. 19 and 20, an additional coupler or adapter blank 90 is designated generally by the numeral 94. Here, color-coded reflective bars 96 are held by setscrews, adhesive, chemical bonding or the like in dovetail ways uniformly spaced about the circumference of the coupler blank 94. In one embodiment of the invention, it is contemplated that the reflective bar may be red, aiding a firefighter in escaping away from a fire in a smoke-filled room. It will be appreciated that the size and shape may vary. Other colors may be used for other purposes.

Figures 21, 22, 23, 24:
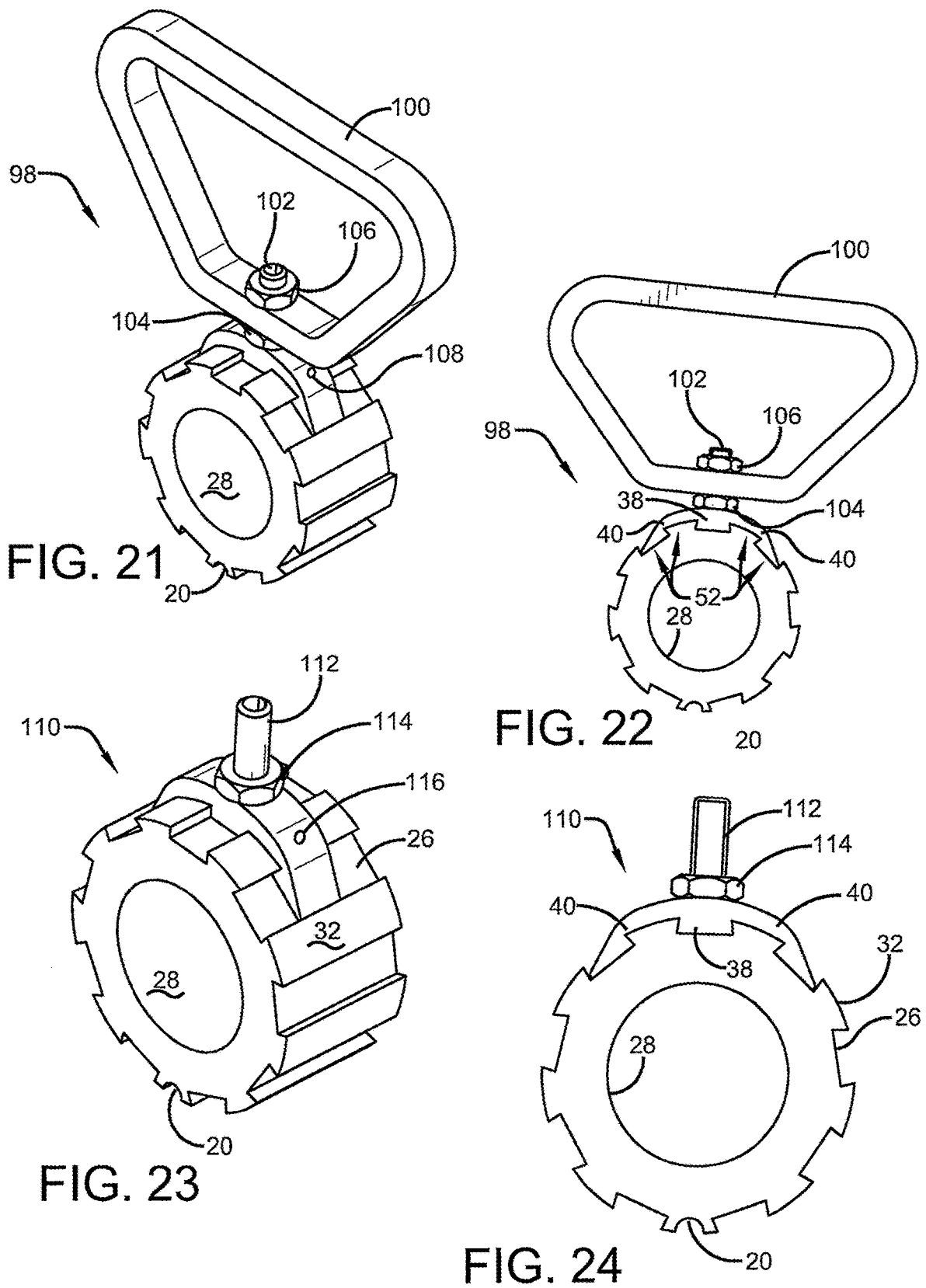
FIG. 21 is a perspective view of a coupler blank according to the invention and showing the same receiving a detachable handle while leaving an associated adapter in place.
FIG. 22 is a front elevational view of the coupler blank of FIG. 21.
FIG. 23 is a perspective view of a coupler blank according to the invention and showing a stud base extending from the adaptive connector attached thereto.
FIG. 24 is a front elevational view of the coupler of FIG. 23.

With reference to FIGS. 21 and 22, it can be seen that yet an additional embodiment of the invention is designated by the numeral 98, wherein a coupler is fixed with a detached handle 100. Here, the handle is shown as a loop-type handle, although any of various types may be employed. As shown, a threaded stud 102 extends outwardly from the base 38 of the adapter. A first nut 104 is threaded onto the stud 102 and against the base 38. The handle 100 is then received by the stud, which is locked thereto by means of a second nut 106 threaded against the handle 100 into locking engagement between the nuts 104, 106. Those skilled in the art will appreciate that the nut 106 may comprise a locknut. As presented hereinabove, setscrews 108 may be employed to secure the attachment to the dovetail structure of the connector blank in the manner described hereinabove. The handle attachment can aid a firefighter in manipulating the associated hose toward the fire. The size and shape of the handle may vary to accommodate a broad range of uses and users.

With attention now to FIGS. 23 and 24, it can be seen that an additional coupler blank and associated attachment are designated generally by the numeral 110. The coupler 110 has a stud base 112 fixed by means of a nut 114 to the base 38 of the adapter. Setscrew 116 may hold the adapter base in place in typical fashion. It is contemplated that the stud 114 may be internally threaded for receiving any of various types of additional attachments thereto, or such attachments may be slid over the stud 112 and locked thereto by means of appropriate setscrews or the like. It is further contemplated that the stud 112 might be used for attachment to an aerial ladder, truck or the like.

Figures 25, 26:
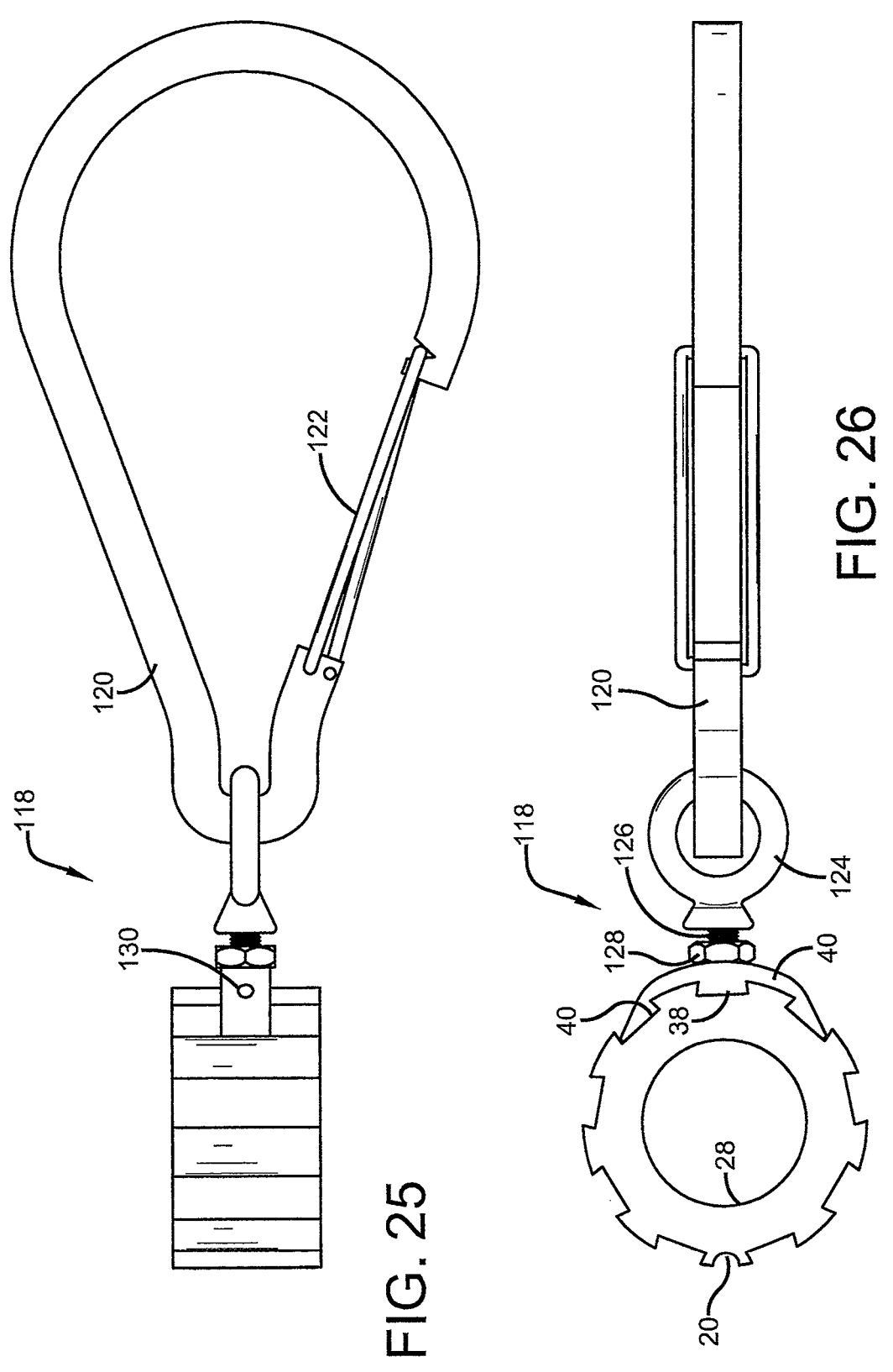
FIG. 25 is a side elevational view of a coupler blank according to the invention, showing the same receiving a carabiner-type hook for use on ladders.
FIG. 26 is a side elevational view of the coupler of FIG. 25.

With reference now to FIGS. 25 and 26, it will be seen that a coupler blank 118 is provided in interconnection with the attachment of a carabiner 120 having a pivotal arm 122 adapted for opening and closing in standard fashion to provide a hook for any of various means. The carabiner 120 is received by an eye 124, which is threaded into a stud base 126, and which may then be locked by means of engagement of the nut 128 against the base of the eye 124. Again, an appropriate setscrew 130 may be employed to secure the dovetail interconnection between the coupler and attachment as described above.

Figures 27, 28:
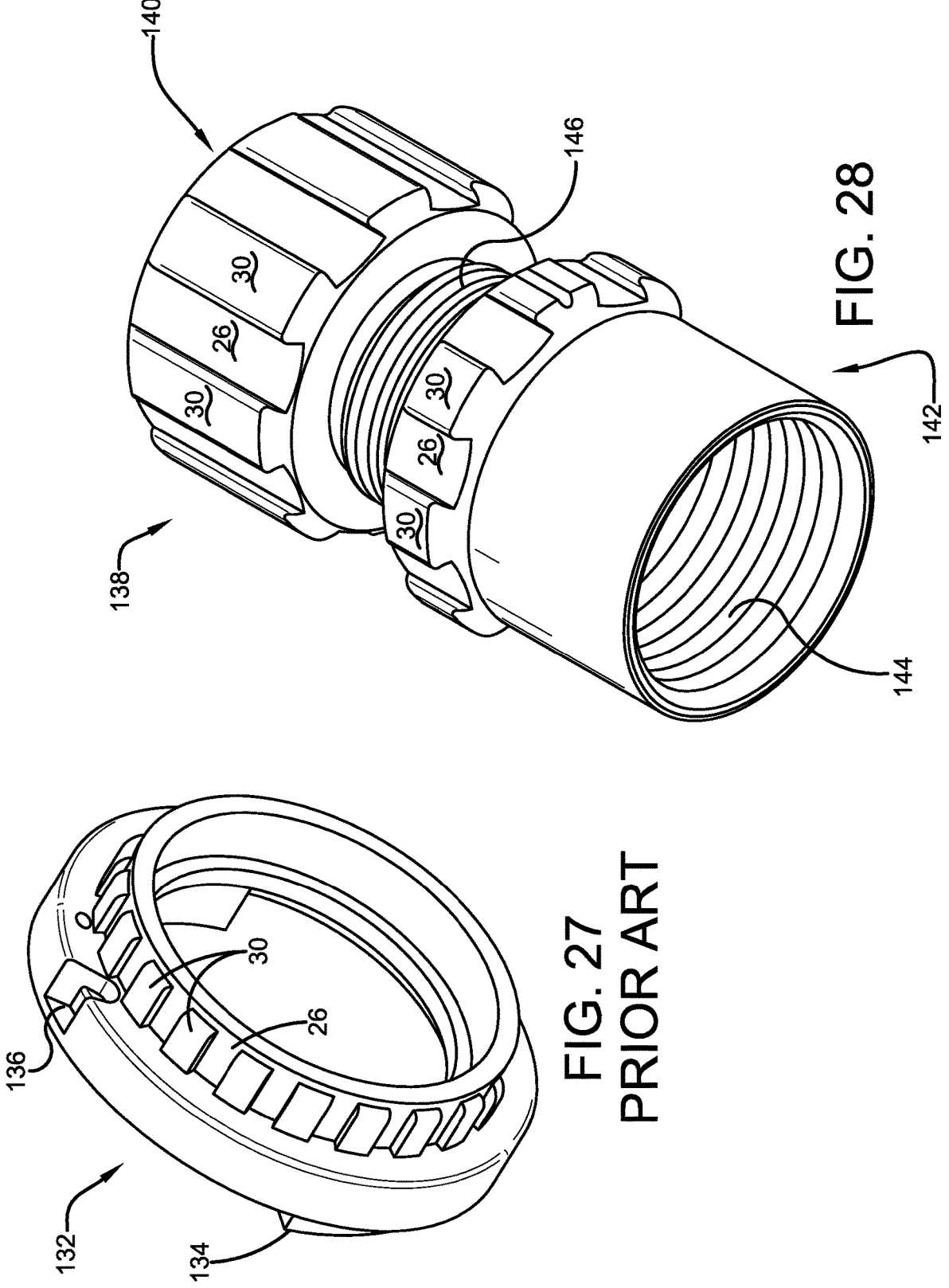
FIG. 27 is a perspective view of a Storz coupling incorporating the concept of the invention.
FIG. 28 is a perspective view of the interconnecting male and female hose couplings made in accordance with the invention.

As discussed above, the instant invention is applicable to a broad range of couplers and adapters, a coupler blank being described throughout by way of example only. As shown in FIG. 27, the concept of the invention is shown as being implemented with a Storz coupling designated generally by the numeral 132. Those skilled in the art will appreciate that FIG. 27 shows one-half of a Storz coupling, the other half being of substantially the same nature. The two are interconnected by means of a pair of dog-ear lugs on each of the two portions of the connectors, the dog-ear lugs 134 interconnecting with ramped surfaces on the opposite portion of the coupling, the interconnection of the dog-ear lugs with the ramped surfaces causing compressive engagement with gaskets interposed between the pair. The compressive engagement of the gaskets provides for a seal between the mating portions 132 of the Storz coupling. In somewhat standard fashion, a notch 136 is provided in the annular coupling 132 for purposes of receiving a locking pin or the like. As shown in FIG. 27, the Storz connectors 132 are provided with dovetail connectors formed by dovetail-shaped lugs 30 in spaced arrangement about the circumferential surface 28. These dovetail connections serve to receive and interconnect with any of a plurality of attachments as discussed above.

With reference to FIG. 28, the interconnection of male and female hose couplings made in accordance with the invention and from the blanks discussed hereinabove is shown and designated generally by the numeral 138. Here, the coupling 138 comprises a male portion 140 received by a female portion 142 by threaded interengagement between the external male threads 146 and the internal female threads

144. Both the male and female portions of the fire hose coupling 138 are populated with dovetailed lugs 32 spaced about the circumferential surface 28. Again, the dovetailed connecting surfaces 32, 28 provide a means adapted for receiving the various attachments identified and discussed above.

Figure 29:
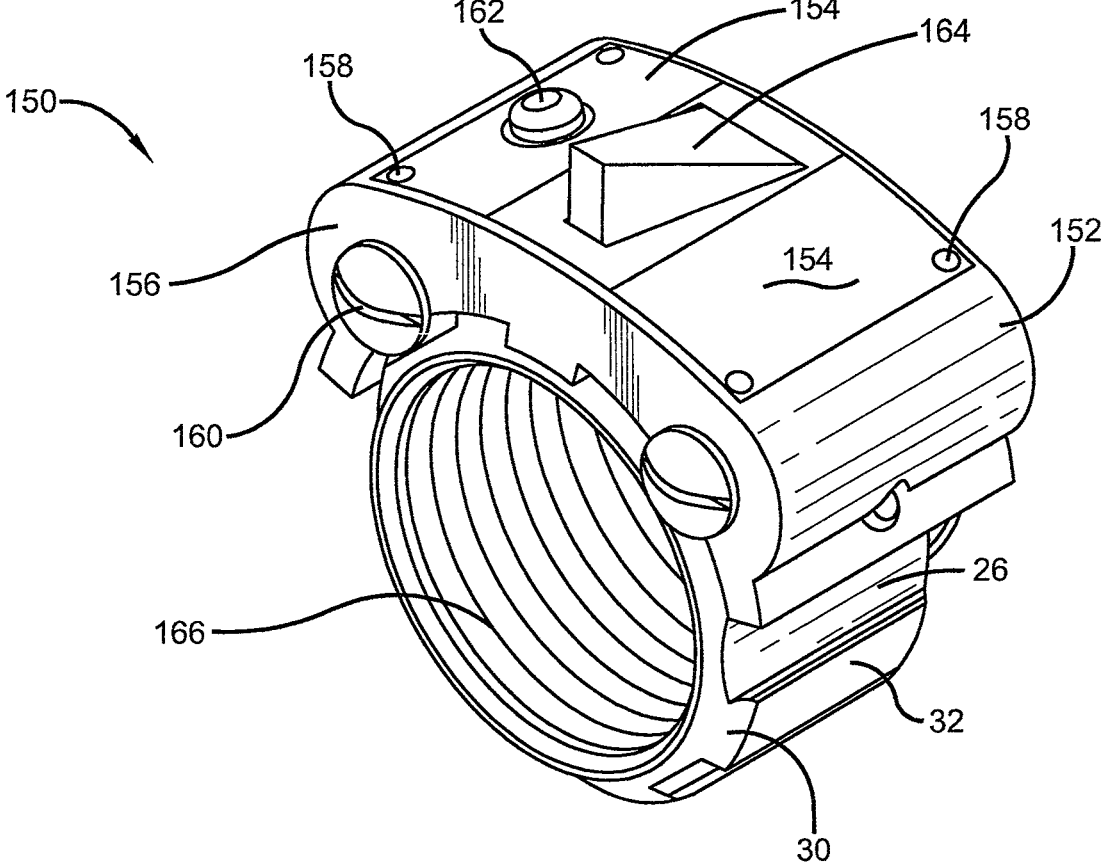
FIG. 29 is a perspective view of a coupler according to the invention employing a directional ramp that may be illuminated manually or by ambient conditions.

Referring now to FIG. 29, a coupler having a directional ramp made in accordance with an embodiment of the invention is designated generally by the numeral 150. As with the general concept of the invention, dovetail-shaped lugs 30 having top curved surfaces 32 are spaced apart by the longitudinal flat surfaces 26. The dovetailed lugs 30 and the inner and outer surfaces 26, 32 provide for mating engagement with a monitor and indicator assembly 152. The assembly 152 has a pair of accessible top panels 154 and an accessible front panel 156 releasably secured by respective screws or the like 158, 160.

Mounted atop the monitor and indicator assembly 152 is a pushbutton switch 162 and a flared ramp 164, which may be selectively illuminated by means of a lamp (not shown) therein. The lamp may be illuminated by means of the pushbutton switch 162 or, alternatively, may be illuminated by means of a temperature sensor, smoke sensor, or other suitable monitoring device. The ramp is flared, being wider at the base and narrower at the top, serving as a directional arrow directing to safety—such as the origin of the associated hose or the like. The flared ramp 164 may be illuminated manually by depression of the pushbutton 162. Alternatively, it may operate off of a temperature sensor, smoke sensor or the like, maintained within the assembly 152 to illuminate when a threshold temperature or smoke level has been reached.

As also shown in FIG. 29, internal female threads 166 are employed to accommodate the inclusion of the coupler 150 in a hose arrangement.

Thus it can be seen that the various aspects of the invention have been achieved by the structures and techniques described in detail above. While in accordance with the patent statutes, only the best mode and preferred embodiment contemplated for the invention have been presented and described in detail, the invention is not limited thereto or thereby. The invention is best defined by the following claims.

What is claimed is:

1. A fire hose coupler, comprising:
an annular ring having an outer circumferential surface characterized by circumferentially uniformly spaced dovetail-shaped lugs thereabout configured to accommodate mating connection with devices complementing the utility of the fire hose coupler beyond simply coupling fire hose sections;
said devices being in mating connection with at least certain of said dovetail-shaped lugs;
wherein said devices comprise handle attachments for the fire hose coupler; and
wherein each handle attachment comprises a first side and a second side opposite the first side, wherein said first side comprises a shape complementary to said outer circumferential surface and is configured to form a dovetail mating interconnection with at least one of said dovetail-shaped lugs, and wherein said second side comprises a handle extending therefrom.

2. The fire hose coupler according to claim 1, wherein said handle is a ribbed handle.

3. A fire hose coupler, comprising:

an annular ring having an outer circumferential surface of uniformly spaced dovetail-shaped lugs thereabout configured to effect mating key and keyway sliding engagements; and a plurality of devices taken from a group of operational and safety devices for fire hoses configured to be received by said annular ring through said mating key and keyway sliding engagements and wherein said mating key and keyway sliding engagements are releasable, and further wherein said devices comprise handle attachments for the fire hose coupler; and wherein each handle attachment comprises a first side and a second side opposite the first side, wherein said first side comprises a shape complementary to said outer circumferential surface and is configured to form a dovetail mating interconnection with at least one of said dovetail-shaped lugs, and wherein said second side comprises a handle extending therefrom.

4. The fire hose coupler according to claim 3, wherein said handle is a ribbed handle extending radially outwardly from said annular ring.

\*   \*   \*   \*   \*